United States Patent Office 3,013,885
Patented Dec. 19, 1961

3,013,885
METHOD OF PRESERVING EDIBLE PLANT MATERIAL AND PRODUCT
Johannes Van Overbeek, Modesto, Calif., assignor to Shell Oil Company, New York, N.Y., a corporation of Delaware
No Drawing. Filed Mar. 31, 1960, Ser. No. 18,822
15 Claims. (Cl. 99—154)

This invention relates to improved plant material compositions characterized by increased resistance to deterioration and to a novel method of protecting plant materials from spoilage. More specifically, the present invention is concerned with and has as its prime object the treatment of green plant materials, particularly green fruits, and vegetables, to preserve edibility and natural color through contact with certain adenine compounds.

In the past, food spoilage caused by chemical breakdown, damage from rough handling and the deleterious effects of bacteria and mold have been enormous. The problem of food wastage has been particularly acute in the case of fresh fruits and vegetables which evidence high susceptibility to deterioration from these causes. Fruit and vegetable spoilage in the United States renders inedible 20% of the annual crop while even those fruits and vegetables which are not rendered inedible undergo deleterious change. For example, it has been found that green leafy vegetables may lose 40 to 50% of their vitamin C content when exposed to warm temperatures for even a short period of time. Vegetables such as sweet corn, peas, asparagus and broccoli are known to stale and to lose their nutritive value if refrigeration is inadequate in the marketing channels. The problem of food loss has become so serious in fact that a multitude of solutions have been devised including the development of plants evidencing increased disease resistance and the employment of advanced methods of harvesting, handling and packaging.

Certain growth-regulating chemicals have also been used to effect changes in fruit and vegetable physiology for the purpose of improving keeping quality. Thus, potato sprouts have been inhibited by chemical treatment, thus making possible storage at higher temperatures. Similarly, the sprouting of onions has been delayed by spraying the plants before harvest with maleic hydrazide and the storage period for lemons has been safely extended by dipping the fruit in growth-regulating chemicals which keep button or stem attachments healthy. In spite of all attempts, however, a simple, economical yet sure method of preserving fresh fruits and vegetables was not heretofore available.

It has now been discovered that the treatment of plant materials such as green fruits and vegetables and ornamental foliage with the adenine derivatives of the present invention brings about a surprising and totally unexpected increased resistance to deterioration and a preservation of color. The present invention contemplates the treatment of plant materials generally but is most particularly suited to the treatment of green flora. As a practical matter, the greatest value is effected by treating green vegetables, particularly those of the leafy variety such as lettuce and spinach; green fruits such as beans, peppers and cucumbers; ornamental foliage; and livestock feeds.

The importance of the discovery of preservative properties in the present adenine derivatives can best be understood by reference to one group of vegetables which has been treated. Though the value of these compounds is discussed with particular reference to lettuce, it is to be understood that these compounds are also valuable in the treatment of other large volume crops not botanically related to lettuce such as spinach and radishes.

Lettuce plants (*Lactuca sativa* L.) and other common salad vegetables botanically related to lettuce such as endive, chicory and escarole must be shipped in refrigerated cars in order to prevent deterioration. It is consequently of the greatest importance that a minimum amount of deterioration takes place between harvesting and retail marketing. Elaborate attempts have been made at all stages to diminish deterioration of lettuce and other edible vegetables and fruit. For example, in the harvesting of lettuce, shallow trailers may be hauled to the field where they are filled with lettuce. These conveyances then carry the lettuce to the packing house where the lettuce is placed gently into packing bins and graded. By using conveyances of this type, individual deleterious handling of the lettuce heads in the field is minimized. Trailers of similar types have been successfully employed with other vegetables and fruits. The necessity for devices of this sort is substantially mitigated through the employment of the adenine derivatives of the present invention, which may be represented by the following structural formula:

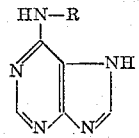

wherein R is an aryl group such as naphthyl, phenyl, tolyl, or anthryl, an aralkyl group such as benzyl or a heterocyclic ring such as furfuryl. When R is a heterocyclic group an oxygen-containing group such as furfuryl is preferred. R is preferably benzyl. It will be appreciated that compounds of the above formula can exist in the form of tautomeric isomers having the equivalent structures represented by the formulae

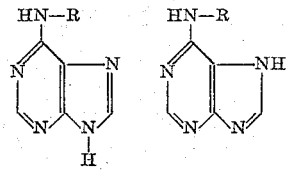

By use of one of the two formulae, it is not intended to exclude the compounds of the other formula; particularly, reference to one of the two formulae is not intended to exclude the presence of the tautomeric isomer in the material actually used to treat plant material according to this invention.

These adenine compounds are amphoteric, and readily form salts with either acids or bases. The salts of these adenine compounds with non-phytotoxic acids, such as the acetate salts, and bases such as the sodium and potassium salts, may be used as the source of the adenine compound in treating plant material. Or, the adenine compound may be in the form of its amide, which is believed to hydrolyze and thus be converted to the free amphoteric adenine compound upon the surface of the plant.

It is to be understood that it is the indicated structural configuration which has been found to impart activity to preserve plant material, and that accordingly the compounds which actively preserve plant material include those having this structural configuration containing one or more lower aliphatic substituents. The substitution will occur, of course, at one or more of the atoms in the 2-, 8- or 9- (equivalently, 7- in the tautomeric isomer) position of the rings, and the exocyclic nitrogen atom.

Examples of specific compounds employed for the purposes of the present invention are $N^6$-benzyladenine, $N^6$-phenyladenine, $N^6$-tolyladenine, $N^6$-furfuryladenine, $N^6$-benyl-2-methyladenine, $N^6$-benzyl-8-methyladenine, $N^6$-phenyl-9-methyladenine and $N^6$-benzyl-7-methyladenine, $N^6$-benzyl-$N^6$-benzoyladenine, $N^6$-ethyl-$N^6$-benzyladenine, $N^6$-benzyl-$N^6$-(p-toluenesulfonyl)adenine, $N^6$ - phenyl-2-(methylthio)adenine, and the like.

Several procedures are available for the preparation of the $N^6$-substituted adenines employed for the purposes of the present invention. First, it is possible to replace the methylthio group of 6-(methylthio)purine with an amine. Next, if desired, adenine may be acylated and the resulting amide reduced. Third, the chlorine of 6-chloropurine may be replaced with a substituted amino group. The substituted adenines are conveniently prepared by a method which will depend to a great extent upon the position of the substituent group or groups.

Where the derivative is to be one wherein the exocyclic nitrogen atom of the adenine structure is to be bonded to two organic groups, and the adenine structure is otherwise unsubstituted as set out hereinbefore, the derivative is most conveniently prepared by reacting a 6-(alkylthio)purine or a 6-halopurine with the appropriate secondary amine. The purines are known compounds, and the way in which these reactions are carried out is well known in the art.

Adenines substituted at the 9- (7-) position are readily prepared by reacting an alkali metal salt of the adenine with a halide of the desired substituent.

Adenines substituted at the 2-position are readily prepared by reacting the appropriately 2-substituted 4,5,6-triaminopyrimidine with an appropriate acid or acid anhydride, then reacting the resulting adenine with a carboxylic acid anhydride to form the corresponding $N^6$-amide, then reducing the amide with lithium aluminum hydride to the corresponding $N^6$- and 2-substituted adenine. As an alternative procedure, the adenine resulting from reaction of the diaminopyrimidine and the acid or acid anhydride can be reacted with the appropriate alcohol in the presence of strong base to alkylate the adenine at the exocyclic nitrogen atom, forming the desired $N^6$- and 2-substituted adenine.

Adenines substituted at the 8-position are readily formed in the same way as the 2-substituted adenines, using the appropriately substituted acid or acid anhydride. The following examples illustrate in detail the preparation of compounds which lend themselves to the purposes of the present invention. It is to be understood, however, that the present invention is not limited to the employment of compounds prepared by these specific methods but also contemplates the use of adenine derivatives for the preservation of vegetables and fruits when prepared by other methods known to those versed in the art.

EXAMPLE I $N^6$-benzyladenine 10 grams of adenine and 25 grams of benzoic anhydride were heated on a steam bath for two hours, and then at 140° C. for four hours. 200 milliliters of water was added and the mixture was refluxed for one hour followed by neutralization with $NaHCO_3$. Filtration gave a crude solid which upon crystallization from ethyl alcohol yielded 3.5 grams of $N^6$-benzoyladenine as needles. A second crop amounted to 4.5 grams. Six grams of $N^6$-benzoyladenine was then added to a slurry of 3 grams $LiAlH_4$ in 200 milliliters of tetrahydrofuran and the mixture was stirred for five hours, the last two under reflux. Ethyl acetate was added dropwise until no reaction occurred and water was then added dropwise until a white precipitate formed. The solid was filtered and washed with boiling tetrahydrofuran. The combined filtrates were evaporated, water was added to the residue, and the resulting solution was neutralized with acetic acid. The white precipitate which formed was filtered and dissolved in dilute NaOH solution. After charcoaling the alkaline solution was neutralized with acetic acid to yield 1.8 grams of $N^6$-benzyladenine, M.P. 225–228° C. Recrystallization from ethyl alcohol gave pure product melting at 243–244° C.

Analysis.—Calculated: N, 29.3%. Found: N, 28.4%.

EXAMPLE II $N^6$-1-naphthyladenine

A solution of 4.0 grams of 6-chloropurine and 12 grams of alpha-naphthylamine in 100 milliliters of butyl alcohol was refluxed for two hours. A solid was filtered from the hot reaction mixture and washed with butyl alcohol. The solid, 4.2 grams, was pale yellow and had a melting point of about 300° C. (dec.). Recrystallization of a specimen from 50% ethyl alcohol gave the hydrochloride of $N^6$-1-naphthyladenine, M.P. 300–305° C. (dec.).

Analysis.—Calculated: C, 60.0%; H, 4.0%; N, 23.5%; Cl, 11.9%. Found: C, 60.2%; H, 4.7%; N, 23.2%; Cl, 11.6%.

The hydrochloride was dissolved in aqueous methanol and sodium acetate was added to yield 4 grams of product as pale yellow crystals. Recrystallization from aqueous methanol gave pure product melting at 278–279° C.

Analysis.—Calculated: C, 69.0%; H, 4.2%; neut. equiv., 261. Found: C, 68.2%; H, 3.8%; neut. equiv., 254.

EXAMPLE III $N^6$-furfuryladenine

To a slurry of 3 grams of $LiAlH_4$ in 200 milliliters of tetrahydrofuran, 5 grams of $N^6$-furoyladenine prepared similarly to the $N^6$-benzyladenine of Example I, was added in portions in 20 minutes and the mixture was stirred for three hours at room temperature and three hours more at reflux. Ethyl acetate was added dropwise to the cooled mixture until there was no apparent reaction and water was added dropwise until hydrolysis was complete. The mixture was filtered and the remaining solid was washed with tetrahydrofuran. Evaporation of the combined filtrates afforded a light brown solid which was recrystallized from absolute alcohol to yield 1.5 grams of product, M.P. 169–170° C. (dec.).

Analysis.—Calculated: N, 32.5%. Found: N, 32.7%.

EXAMPLE IV $N^6$-phenyladenine

A mixture of 2.0 grams of 6-(methylthio)purine trihydrate and 10 milliliters of aniline was heated at 180° C. for 24 hours. After cooling the resulting tan-colored solution was poured into 100 milliliters of ethyl ether. The pale yellow solid which precipitated was recrystallized from 50% ethyl alcohol to yield 0.5 gram of product as light yellow crystals, M.P. 284° C.

Analysis.—Calculated: C, 62.6%; H, 4.3%. Found: C, 63.0%; H, 5.1%.

EXAMPLE V $N^6$-benzyl-2-methyladenine 2-methyladenine was prepared by hydrogenating 4,6-diamino-5-benzenediazo-2-methylpyrimidine hydrochloride in the presence of formic acid, using palladium as catalyst. 1.7 grams of the 2-methyladenine was treated with 25 milliliters of benzyl alcohol and 1.7 grams of sodium hydroxide. Excess alcohol was removed and the residue neutralized. 0.5 gram of product, melting at 280–283° C., was obtained, which upon purification yielded $N^6$-benzyl-2-methyladenine in the form of tan platelets, melting point 285–6° C.

Analysis.—Calculated: C, 65.3%; H, 5.5%; N, 29.3%. Found: C, 64.7%; H, 5.6%; N, 29.2%.

EXAMPLE VI $N^6$-benzyl-8-methyladenine 6-chloro-8-methylpurine was prepared by reacting 4,5-diamino-6-chloropyrimidine with acetic anhydride in the presence of ethyl ortho-acetate. The crude adenine was mixed with ten milliliters of benzyl alcohol, the mixture heated to reflux for 10 minutes, then cooled and concentrated under vacuum. The residue was taken up in 100 milliliters of sodium hydroxide and warmed to 50° C. for 10 minutes. The product was precipitated from the aqueous phase by adding acetic acid to neutrality. 1.5 grams of dry tan powder melting at 290–294° C. was obtained. On recrystallization, 1.1 grams of nearly colorless needles of $N^6$-benzyl-8-methyladenine, melting at 294–5° C., was obtained.

*Analysis.*—Calculated: C, 65.3%; N, 29.3%. Found: C, 65.8%; N, 29.1%.

EXAMPLE VII

$N^6$-benzyl-8-ethyladenine

In a manner similar to that described in Example VI, $N^6$-benzyl-8-ethyladenine was prepared from 6-chloro-8-ethylpurine and benzyl alcohol. The product was colorless crystals melting at 210–11° C.

*Analysis.*—Calculated: C, 66.4%; H, 5.9%; N, 27.6%. Found: C, 65.9%; H, 6.2%; N, 27.7%.

EXAMPLE VIII

$N^6$-benzyl-9-methyladenine 3 grams of $N^6$-benzyladenine was converted to its sodium salt and dissolved in 30 milliliters of water. 3 grams of methyl iodide was added and the mixture stirred for three hours, then neutralized with acetic acid. Base soluble material was removed by extracting the product with dilute sodium hydroxide. The residue was extracted with 95% ethanol. The product was precipitated as the hydrochloride by adding 1 milliliter concentrated hydrochloric acid and chilling. The crude product was recrystallized twice from 95% ethanol to give 0.45 gram of pure $N^6$-benzyl-9-methyladenine in the form of colorless needles melting at 237–8° C.

*Analysis.*—Calculated: N, 25.4%; Cl, 12.9%. Found: N, 25.1%; Cl, 13.2%.

EXAMPLE IX

$N^6$-benzyl-$N^6$-methyladenine

A mixture of 2 grams of 6-chloropurine and 5 grams of N-methylbenzylamine in 40 milliliters of butyl alcohol was refluxed for 45 minutes to yield, after removal of solvent, a thick slurry which was removed, leaving 2.0 grams of yellow-green solid melting at 216–218° C. Recrystallization from isopropyl alcohol gave colorless crystals of $N^6$-benzyl-$N^6$-methyladenine melting at 218–219° C.

*Analysis.*—Calculated: C, 65.3%; N, 29.3%. Found: C, 65.2%; N, 29.2%.

EXAMPLE X

$N^6$-benzyl-$N^6$-acetyladenine

A solution of 2 grams of $N^6$-benzyladenine in 20 milliliters of acetic anhydride was refluxed for three hours, the mixture poured over ice and allowed to stand overnight to hydrolyze the excess acetic anhydride. The solid product was filtered and dried, giving 2.2 grams of tan crystals melting at 163–166° C., which were taken up in methanol, treated with charcoal and chilled to obtain nearly colorless crystals of $N^6$-benzyl-$N^6$-acetyladenine melting at 166–167° C.

*Analysis.*—Calculated: C, 63.0%; H, 4.9%; N, 26.2%. Found: C, 62.1%; H, 5.4%; N, 26.3%.

EXAMPLE XI

$N^6$-benzyl-9-(methylsulfonyl)adenine

A suspension of 2.25 grams of $N^6$-benzyladenine in 25 milliliters of pyridine was treated with 1.5 grams of methylsulfonyl chloride. The mixture warmed slightly and rapidly formed a clear solution. After about 5 minutes, the solution was poured into 200 milliliters of ice water. The product separated as fine needles, was filtered, washed with water and dried to yield 2.5 grams of product, melting point 153–154° C. Recrystallization from isopropyl alcohol gave colorless needles of $N^6$-benzyl-9-(methylsulfonyl)adenine, melting at 154° C., resolidifying and remelting at 163–164° C.

*Analysis.*—Calculated: N, 23.1%; S, 10.6%. Found: N, 23.1%; S, 11.0%.

EXAMPLE XII

$N^6$-benzyl-$N^6$-nitrosoadenine

A solution of 4.5 grams of $N^6$-benzyladenine in 200 milliliters of 50% aqueous acetic acid was maintained at 15° C. during the addition of 2 grams of sodium nitrite dissolved in 10 milliliters of water over a period of 10 minutes. The mixture was allowed to come to room temperature and stand overnight. The solid that had separated was filtered, washed with water and dried. The yield of pale yellow product was 4.4 grams of $N^6$-benzyl-$N^6$-nitrosoadenine, melting point about 226° C., with decomposition and gas evolution. The specific melting temperature depends somewhat on the heating rate.

*Analysis.*—Calculated: C, 56.7%; H, 3.9%; N, 33.1%. Found: C, 56.3%; H, 4.0%; N, 32.9%.

Extensive tests have been conducted which unequivocally illustrate the effectiveness of the adenine derivatives of the present invention in preserving fruits and vegetables, particularly green leafy vegetables. Thus, mustard greens (*Brassica juncea*) were sprayed with a saturated solution of $N^6$-1-naphthyladenine in a concentration of one part per million in water and were placed in a fog room. Control leaves were also placed in a fog room in the absence of light. After three days in the fog room, the control leaves were found to be completely yellow or pale. By contrast, the leaves sprayed with the $N^6$-1-naphthyladenine were dark green and fresh looking. This experiment was repeated on spinach and lettuce leaves with very favorable results. Other compounds which manifest significant activity in this test are: $N^6$-benzyladenine, $N^6$-furfuryladenine and $N^6$-phenyladenine.

In another test $N^6$-1-naphthyladenine, $N^6$-phenyladenine and $N^6$-furfuryladenine were each sprayed on mustard greens (*Brassica juncea*) about 24 hours after they were cut in the field. Aqueous compositions containing these materials in concentrations ranging from about 1.25 to approximately 5 parts per million by weight (p.p.m.) of the water were sprayed on the foliage. After spraying the foliage was stored in open plastic bags at 100% humidity and 80° F. Three days later the total weight of the leaves was determined as well as the weight of the rotted and yellowed leaves which were discarded. The test continued for several days after the initial spraying when the weighings were repeated. The test three days after spraying indicated that only 34% of the untreated leaves had remained green. All the treatments, even those with only 1.25 p.p.m., showed at least twice the number of green leaves when compared with the untreated leaves. $N^6$-1-naphthyladenine at 2.5 p.p.m. maintained 83% of the leaves in green condition. $N^6$-phenyladenine at a concentration of 5 p.p.m. maintained about 87% of the leaves in green condition after three days. Seven days after the initial spraying no green leaves remained in the untreated checks, yet all plants treated with the compounds of the present invention evidenced the effectiveness of these compounds in preserving green color. For example, at a concentration of 5 p.p.m. $N^6$-(1-naphthyl)adenine preserved more than 30% of the green leaves after the seven days.

In another test an aqueous solution of 5 p.p.m. $N^6$-benzyladenine was sprayed on Great Lakes lettuce two days before harvest and again immediately before harvest. After harvest the lettuce was packed in cartons and passed through a commercial evacuation plant for cooling. The cartons were then transferred to a cold room and maintained at 40° F. for 13 days followed by storage at 75° F. for three days. When these cartons were opened the untreated lettuce was pale and wilting. The lettuce treated with $N^6$-benzyladenine, however, showed a healthy dark green color.

In a similar test, lettuce heads were sprayed with $N^6$-benzyladenine and with $N^6$-phenyladenine and stored continuously at 40° F. for three weeks without precooling. The condition of the lettuce sprayed with $N^6$-benzyladenine was far superior in appearance to the control. The lettuce treated with $N^6$-phenyladenine also showed a significantly fresher appearance than the untreated heads.

Tests on butter lettuce and Australian lettuce also evidenced the striking effectiveness of $N^6$-benzyladenine. In these tests the lettuce was treated approximately 24 hours after harvest at the rate of 100 cc. of 5 p.p.m. aqueous solution per four heads. The heads were tightly packed, as in commercial practice, in cartons and stored for 2½ days at 75° F. Due to respiration of the foliage the temperature within the carton rose to over 100° F. At the end of this period the control heads were pale in color whereas those treated with $N^6$-benzyladenine looked as fresh as when initially treated with $N^6$-benzyladenine.

In another experiment outstanding preservation under storage conditions was obtained for the green tops of radishes treated with phenyladenine. The radishes were sprayed with 5 p.p.m. $N^6$-phenyladenine and stored in perforated plastic bags in cartons at 75° F. After two days the treated radishes showed no significant signs of deterioration whereas the untreated radishes were pale yellow. In a second test with radishes the products showed no significant signs of deterioration whereas the untreated radishes were pale yellow. In a second test with radishes, the products were stored for six days at 40° F., followed by one day at 75° F. Here again, $N^6$-phenyladenine preserved the color, whereas without treatment there was severe deterioration. Tests with $N^6$-benzyladenine gave similar results.

The following table summarizes a test wherein compounds employed for the purposes of the present invention were applied to freshly harvested radish foliage by dipping. The radish foliage was then stored in unperforated plastic bags for 3–5 days in the dark at 70° F. Tests were conducted at concentrations of 10 and 5 p.p.m. The concentration which gave the greatest percentage of green leaves after three days' storage is reported in the table.

PERCENT OF GREEN FOLIAGE AFTER THREE DAYS' STORAGE AT 70° F.

[Listed in order of estimated activity]

| Material | Formulation | Concentration in Final Solution (p.p.m.) | Percent Green Foliage |
|---|---|---|---|
| Untreated | | | 10 |
| $N^6$-benzyl-8-methyl-adenine | 1 gram in 20 milliliters one normal sodium hydroxide. | 5 | 90 |
| $N^6$-benzyl-$N^6$-nitrosoadenine | 1 gram in 20 milliliters one normal sodium hydroxide. | 5 | 85 |
| $N^6$-benzyladenine | 1 gram in 5 milliliters acetic acid + 95 milliliters ethanol. | 10 | 68 |
| $N^6$-benzyladenine-Na salt. | Water. | 10 | 96 |

Other specific adenine compounds of this invention which have been found to preserve leafy vegetables are:

$N^6$-(1-naphthylmethyl)adenine
$N^6$-benzyl-$N^6$-methyladenine (HCl salt)
$N^6$-benzyl-9-methyladenine (HCl salt)
$N^6$-benzyl-2-methyladenine
$N^6$-benzyl-8-ethyladenine
$N^6$-benzyl-2-(methylthio)adenine
$N^6$-benzyl-$N^6$-acetyladenine It is known that light, such as sunlight, has a preservative effect upon excised plant material. In tests just described, the excised leafy vegetable materials were treated according to the process of this invention, then were stored in a dark room or in a substantially light-proof container. In all cases the edibility and color of the leafy vegetables were preserved. This demonstrates that the process of the invention effectively enables the preservation of leafy vegetable materials even in the substantial absence of light.

The reason for the extraordinary effectiveness of the described compounds in preserving edibility and color of plant materials is not fully understood. It is believed, however, that these adenine derivatives inhibit vegetable proteolysis. Though the exact mechanism is not known at this juncture, it is clear from the results of experiments that the effect of these compounds involves an intimate interaction of the chemical and plant material whereby the desired results are brought about. Because of the chemical interaction of these adenine compounds with vegetable material, it is now possible to employ the products so formed in ways heretofore considered impossible. Hence, after treatment the vegetable materials may be shipped or stored for significantly longer periods of time than heretofore considered even remotely possible wtihout refrigeration. Yet these unique treated food materials in no way manifest a perceptible change in taste or other deleterious effects. The maintenance of edibility and preservation of color over extended periods of time without refrigeration under the described method of treating vegetable materials and the novel vegetable materials so produced a significant advancement in the art.

Since vegetables such as radishes and lettuce are sprayed or washed prior to packing, it is preferred to contact them with an adenine derivative of the present invention at that stage. It will be understood, however, that if desired, the compounds of the present invention may be sprayed or otherwise contacted with the vegetables at any time between harvesting and consumption.

In other words, these compounds may be sprayed or otherwise contacted with the vegetables or fruits, while in the field before picking, directly subsequent to picking but before packing, while in the conveyance which carries the edible vegetables or fruits to the packing house or during the packing operation. It is, of course, also possible to apply the compounds of the present invention at any time subsequent to the packing. Thus, the vegetable wholesaler, retailer, or consumer may use the present method of preserving edible fruits and vegeables with notable success. It has been found generally preferable to treat the vegetables immediately before or after harvesting.

The adenine compounds of the invention may be formulated in a variety of ways. It is generally desirable that the adenine compound be dissolved in a suitable solvent. Where the plant material to be preserved will be consumed by a human, or an animal, it is essential that the solvent be non-toxic and sufficiently volatile to evaporate from the plant within a reasonable time. The solvent of course should be inexpensive. In many cases, the alkali metal, particularly the sodium, salt of the adenine compound is sufficiently soluble in water. In such cases, a solution of the salt may be used. In these or other cases, it may be more convenient to employ an acid salt which is soluble in a liquid other than water. For example, the salts of the adenine compounds with lower alkane carboxylic acids, particularly the acetic acid salts, are soluble in lower alcohols, particularly ethanol. In this latter, usually preferable, case, the adenine compound is dissolved in at least sufficient acetic acid to form the salt (an excess of acid can be used, if desirable) and the solution is diluted with ethanol. Since some water can be present, aqueous acetic acid solutions can be used, although it is preferred to maintain the water content low to prevent precipitation of the salt at low temperatures. It has been found that the stability of these solutions at low temperatures can be increased, if necessary, by increasing the acid concentration. Thus a mixture of 1.2 percent by weight of $N^6$-benzyladenine, 6.5 percent by weight acetic acid and 92.3 percent by weight ethanol has been found stable—i.e., none of the adenine salts precipitates—at temperatures above about 50° F. but tends to be somewhat unstable below those temperatures. Similar compositions which are stable to 32° F. or lower are formed by increasing the acetic acid concentration. For example, the acetic acid concentration can be increased to as much as 20 to 30 percent by weight, or even more, to increase the stability of the formulation.

Alternatively, a solubilizing agent may be used, useful non-toxic solubilizing agents being the higher fatty acid monoesters of polyoxyethylene sorbitan, such as the monostearate ester and mixtures of the monostearate and monopalmitate esters.

Emulsifiers also can be added to improve the wetting properties of the formulation. Suitable non-toxic emulsifiers include the higher fatty acid monoesters of polyoxyethylene sorbitan already described as solubilizing agent, or higher fatty and monoesters of glycerine, such as glyceryl monostearate and glyceryl monooleate.

The concentration of the compound may vary considerably. Five parts per million by weight (p.p.m.) is considered optimum though the compounds of the present invention are effective in more dilute concentrations such as 1 p.p.m. As a practical matter, 0.5 p.p.m., based on the weight of the fresh food product, is considered minimum, though more dilute concentrations also evidence effectiveness.

The present invention, of course, is not limited to the above-mentioned vegetables but contemplates preservation of all edible vegetables and fruits generally. For example, the invention may be sprayed on potatoes before or after peeling. In fact, if desired, peeled potatoes my subjected to slicing prior to treatment with the adenine derivatives for convenience and economy in shipping directly to restaurants where they are used for making French-fried potatoes. Similarly, apples may be sprayed before or after peeling. It is also possible to spray peeled, cored, sliced apples for the purpose of preserving them during shipment to market. In like manner, peaches, pears, apricots, melons, cherries, peas, beans, cauliflower, tomatoes, artichokes, string beans, carrots, beets, etc., may also be treated with the compounds of the present invention. It has been noted that though of very wide application the compounds of the present invention are particularly outstanding in the treatment of green leafy vegetables.

To show the character of the adenine compounds contemplated by this invention the following more detailed description is appended.

The compounds can be described by the two formulae, two formulae being required because of the fact that the adenine precursors form tautomeric isomers in which the nitrogen double bond in the five-membered ring occurs at both the $N^7$- and $N^9$-nitrogen atoms, and because both types of compounds are equivalent in this invention:

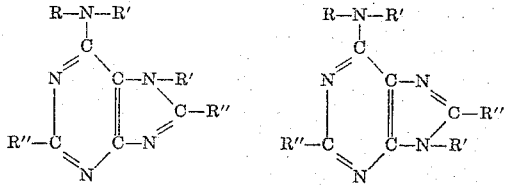

wherein R is, of course, aryl, aralkyl or heterocyclic. Since the amides are suitable, R' can be acyl. Also, since the lower aliphatic substituted adenines of this kind are suitable for the purposes of this invention, one or more of R' and R" can be lower aliphatic.

Since R can be aryl, it suitably can be phenyl, hydrocarbon-substituted phenyl—such as biphenylyl, or an aliphatic-substituted phenyl radical, such as the mono- and poly(lower alkyl)phenyl radicals—or a phenyl radical substituted by one or more substituents. Since R can be aralkyl, it can suitably be the benzyl radical, the alphamethylbenzyl radical, the phenethyl radical, the phenylbenzyl radical, mono- and poly(lower alkyl)benzyl radicals, or other hydrocarbon aralkyl radicals, or it can be an aralkyl radical substituted by one or more non-hydrocarbon substituents. In those adenines wherein R is heterocyclic, it is preferred that the heterocyclic radical be monocyclic and contain in addition to carbon a single hetero oxygen atom, since these heterocyclic radicals impart improved solubility. Examples of such heterocyclic radicals are the furfuryl radical, the pyran radicals, and cyclic forms of sugar radicals, such as the pentoses, particularly the riboses, and the hexoses, wherein the attachment of the radical is from a carbon atom of the ring thereof to the exocyclic nitrogen atom of the adenine structure. Where the group R contains one or more non-hydrocarbon substituents, suitable substituents include for example halogen atoms, particularly chlorine or bromine, lower alkyloxy radicals, the carboxyl radical, lower alkyloxycarbonyl radicals, amino radicals, including $-NH_2$ and particularly the mono- and di(lower alkyl)amino radicals, the hydroxy radical, the nitro radical, the cyano radical, the mercapto radical, lower alkylthio radicals and the like. Those substituents containing oxygen are particularly of interest, since they tend to increase the water-solubility of the adenine compound containing them. Suitably, the group R can contain up to ten, or even more, carbon atoms. Because of the very high activity as plant material preservatives that they exhibit, the adenines wherein R is unsubstituted aryl, aralkyl or carbon-oxygen heterocyclic are preferred.

Since the amides of these adenine compounds are suitable, R' suitably is acyl. For example, acyl containing up to ten carbon atoms, or even more. By acyl is meant the radical derived from an acid by removal of the hydroxyl group, and the acid and resulting acyl group can be either organic or inorganic in character. In the case of a carboxylic acid, $R_a-C(O)-OH$, the acyl radical is: $R_a-C(O)-$, while in the case of a sulfonic acid,

$$R_b-SO_2-OH$$

the acyl radical is: $R_b-SO_2-$, while in the case of an inorganic acid such as nitrous acid, $HO-NO$, the acyl radical is $-NO$. Suitably the acyl radical may be that of a lower aliphatic carboxylic acid or sulfonic acid, the term "aliphatic" having the meaning set out herein, or the acyl radical may be that of an aryl carboxylic acid or sulfonic acid, including those wherein the acyl group is substituted by one or more non-hydrocarbon substituents. The acyl group may suitably be that of a lower aliphatic carbonic acid, an amino acid, a carbamic acid, phosphoric acid, or mono- or di-ester thereof, or a phosphonic or phosphinic acid, or their sulfur analogs, or a boric acid or mono- or diester thereof. The aliphatic acyl groups may be saturated or olefinically unsaturated.

R' and R" can be lower aliphatic, for example, aliphatic up to eight carbon atoms, or more. The term aliphatic is herein intended to have its usual meaning: that is, an aliphatic radical is one which is essentially chain-like in configuration, as opposed to cyclic configuration. The aliphatic radicals represented by R' and R" thus can be aliphatic hydrocarbon, they can be substituted hydrocarbon, or they can be hetero, with atoms other than carbon in the essential chain. Where the aliphatic radical is hetero the atom joining the group to the adenine structure can be carbon, or it can be an atom other than carbon. Thus, to illustrate, R' and R" can be lower alkyl, alkenyl, alkynyl, alkadienyl, or the like, and of either straight-chain or branched-chain configuration, or they can be such groups substituted by one or more non-hydrocarbon substituents (examples of these substituents have already been set out). R' and R" also can represent aralkyl groups. The adenine compounds of this invention wherein R' and R" represent hydrogen or unsubstituted aliphatic of from one to four carbon atoms have been found to exhibit very high activity as preservatives for plant material.

It is to be understood that while the adenines described herein are active plant material preservatives, the activity of individual species will vary, particularly as regards different species of plant materials. By proper selection of the substituents, it is possible to obtain one or more of these adenine compounds which will best preserve a given species of plant material. As a general rule, the plant preservative activity increases with decreasing molecular weight of the adenine compound. For this reason, certain subgenera of these adenine compounds are of primary interest. These subgenera (a) that wherein the radical R is aralkyl, aryl or heterocyclic of up to ten carbon atoms, and the adenine structure is otherwise unsubstituted (R' and R" are all hydrogen), of that subgenus those members wherein R is the benzyl radical being the most active; (b) that wherein the radical R is aralkyl, aryl or heterocyclic of up to ten carbon atoms, and a lower alkyl radical, preferably the methyl radical, is bonded to the carbon atom in the 8-position; and (c) the amides—wherein the radical R is aralkyl, aryl or heterocyclic of up to ten carbon atoms—and an acyl radical is bonded to at least one of: the exocyclic nitrogen atom or the nitrogen atom in the 7- or 9- position (at least one of R' is acyl).

These adenine compounds are amphoteric and readily form salts with both acids and bases. In some cases, it may be found preferable to employ a salt of a particular adenine rather than the adenine itself. This usually will occur where it is found desirable to change the solubility of the adenine compound.

These adenines will form salts with acids generally. Thus, the salts of such inorganic acids as the halogen acids, particularly hydrochloric acid and hydrobromic acid, can be formed, as can the salts of such acids as sulfuric acid, phosphoric acid and boric acid. Both complete salts and partial salts can be formed. The salts of organic acids can also be formed, examples of suitable acids being the aliphatic mono- and polycarboxylic acids (the alkane mono- and dicarboxylic acids of up to ten carbon atoms are preferred), including those which are substituted—as for example the halogenated acids, hydroxy-substituted acids, and the like—alkane and aryl sulfonic acids, phosphonic acids, phosphinic acids, phosphorous acid and its partial esters and the like.

The salts of bases include those of inorganic, as well as organic bases. Salts of alkali metal bases and alkaline earth metal bases are particularly suitable, other salts of inorganic bases being the ammonia salts and salts of polyvalent metals. Salts of organic bases, such as the amines, particularly mono-, di- and trialkyl amines and mono-, di- and trialkanolamines, are suitable, as are quaternary ammonium salts, sulfonium salts, phosphonium salts, salts of hetero nitrogen bases, and the like.

The adenines also form salts with compounds which exist in the form of zwitterions, the salts of this type most suitable being the salts of the versene-type compounds—that is, salts of ethylenediamine tetraacetic acid and the like.

This application is a continuation-in-part of my co-pending application Serial No. 693,818, filed November 1, 1957, now abandoned.

I claim as my invention:

1. A process for preserving the color and edibility of edible plant material suitable for human consumption comprising contacting said plant material with a compound having the following structural formula:

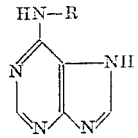

wherein R is chosen from the class consisting of aryl, aralkyl, and heterocyclic groups, and the salts, amides and lower aliphatic derivatives of such isomers, said compound being present in an amount sufficient to effectively preserve said plant material.

2. A process according to claim 1 wherein the group R is an aralkyl group, and the adenine is otherwise unsubstituted.

3. A process according to claim 1 wherein the plant material is selected from the group consisting of lettuce and salad vegetables botanically related to lettuce.

4. A process according to claim 3 wherein the group R is an aralkyl group and the adenine is otherwise unsubstituted.

5. A process according to claim 1 wherein the plant material is an apple.

6. A process according to claim 5 wherein the group R is an aralkyl group and the adenine is otherwise unsubstituted.

7. A process for preserving the color and edibility of edible plant material suitable for human consumption comprising contacting said plant material with $N^6$-benzyladenine in an amount sufficient to effectively preserve said plant material.

8. A process for preserving the color and edibility of edible plant material suitable for human consumption comprising contacting said plant material with $N^6$-phenyladenine in an amount sufficient to effectively preserve said plant material.

9. A process for preserving the color and edibility of edible plant material suitable for human consumption comprising contacting said plant material with $N^6$-i-naphthyladenine in an amount sufficient to effectively preserve said plant material.

10. A process for preserving the color and edibility of edible plant material suitable for human consumption comprising contacting said plant material with $N^6$-furfuryladenine in an amount sufficient to effectively preserve said plant material.

11. The improved edible food composition produced by the process of claim 1.

12. The improved edible food composition produced by the process of claim 7.

13. The improved edible food composition produced by the process of claim 2.

14. The improved edible food composition produced by the process of claim 4.

15. The improved edible food composition produced by the process of claim 6.

References Cited in the file of this patent

UNITED STATES PATENTS

| | | |
|---|---|---|
| 2,615,814 | Geary | Oct. 28, 1952 |
| 2,665,217 | Meuli | Jan. 5, 1954 |
| 2,686,719 | Chenicek | Aug. 17, 1954 |
| 2,890,120 | Makower | June 9, 1959 |